Oct. 13, 1925.
T. E. MURRAY
1,556,869
MOLDING CORE AND METHOD
Filed Oct. 24, 1923   3 Sheets-Sheet 1
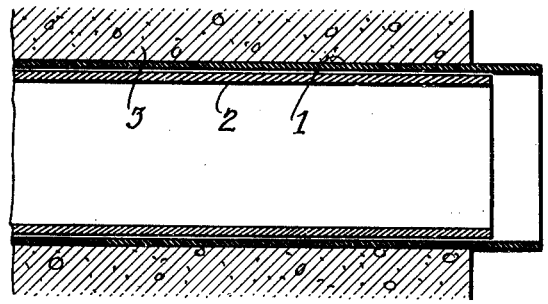
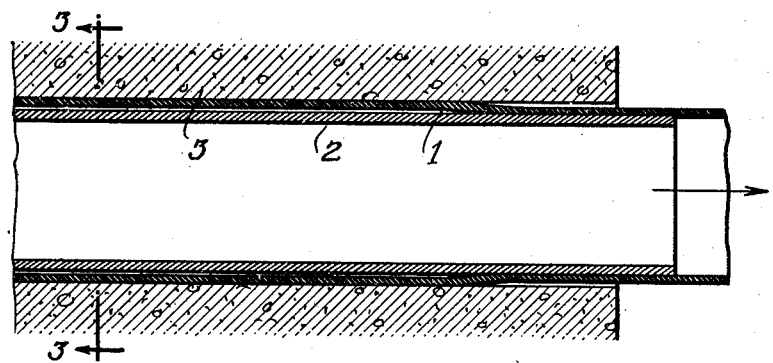
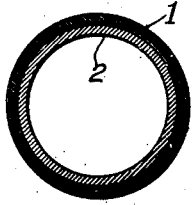 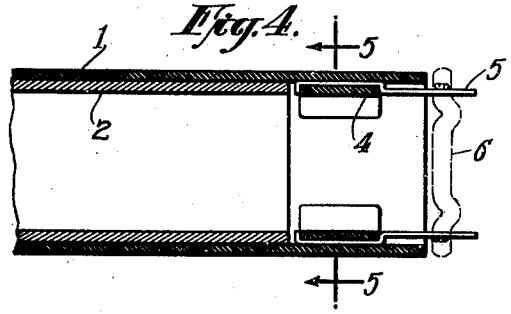 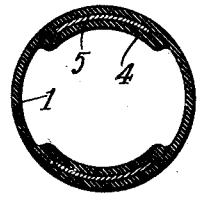
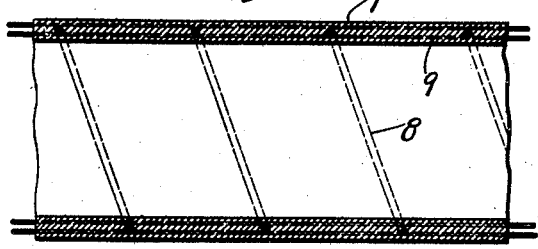 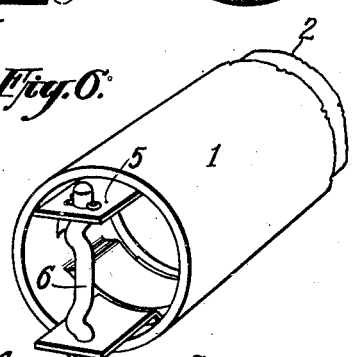
Inventor
Thomas E. Murray
By His Attorney
A. Anthony Usina

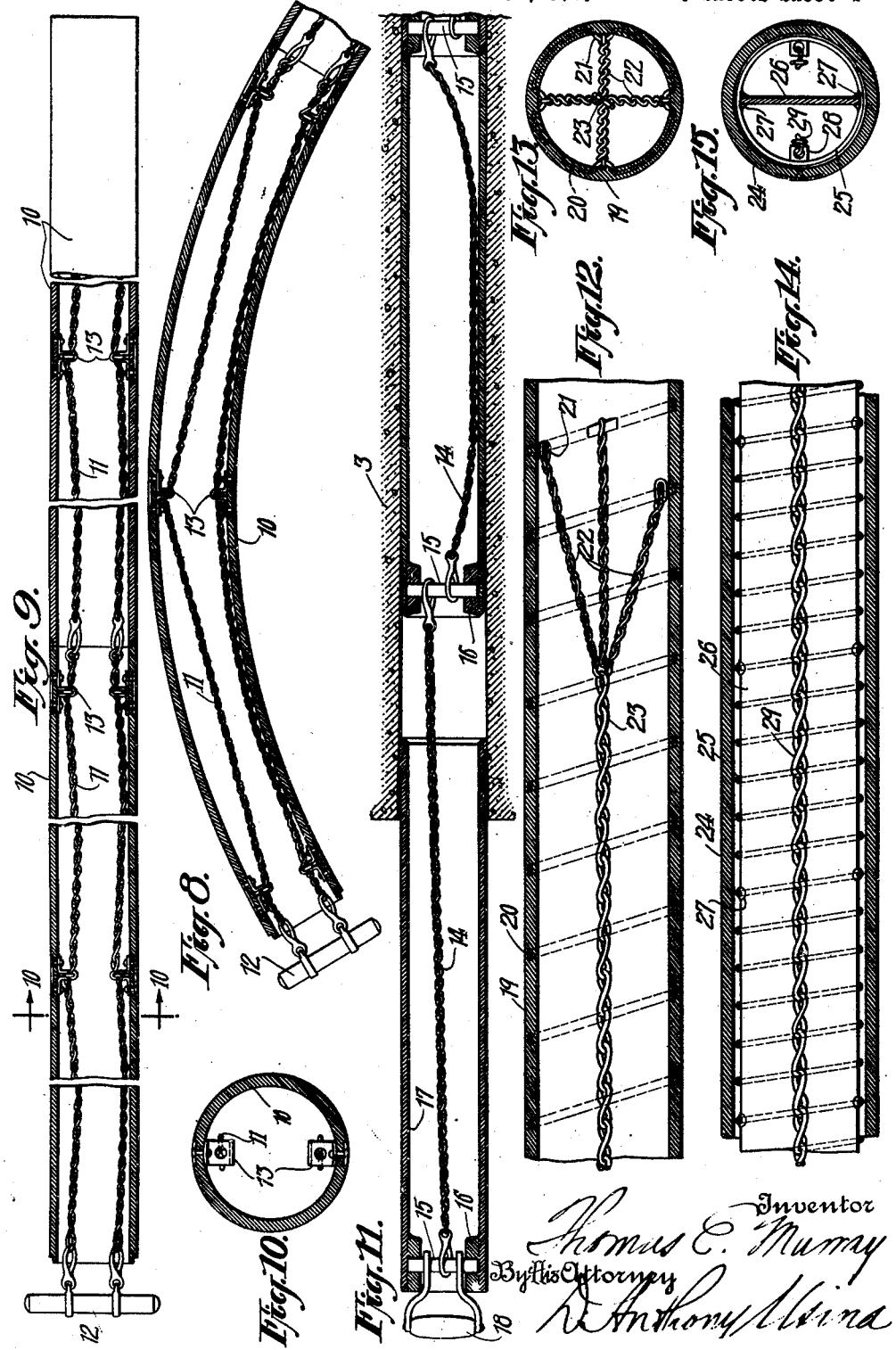

Oct. 13, 1925.  
T. E. MURRAY  
1,556,869  
MOLDING CORE AND METHOD  
Filed Oct. 24, 1923   3 Sheets-Sheet 3
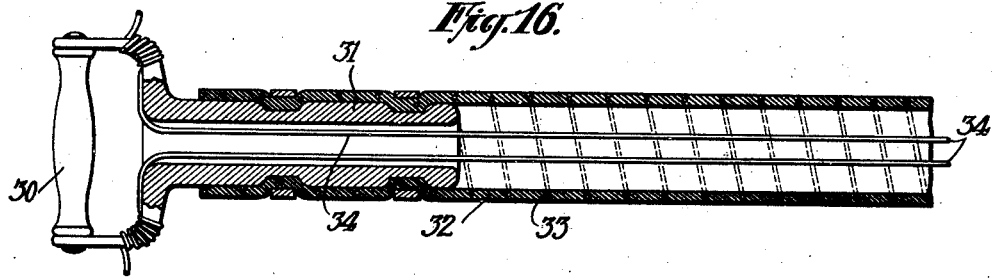
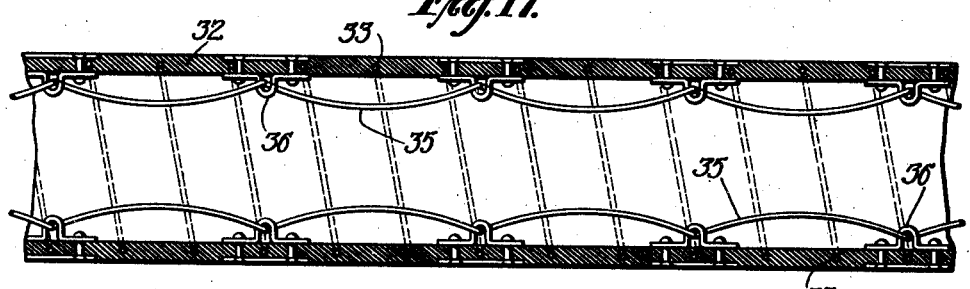
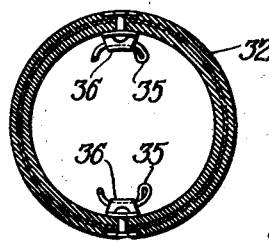
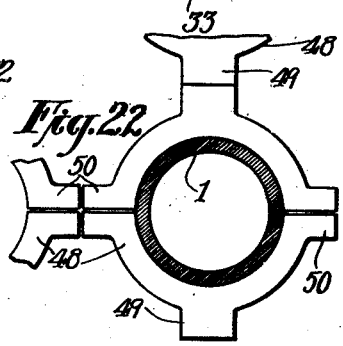
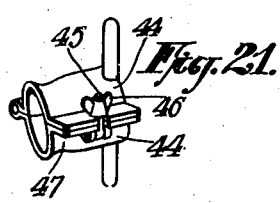
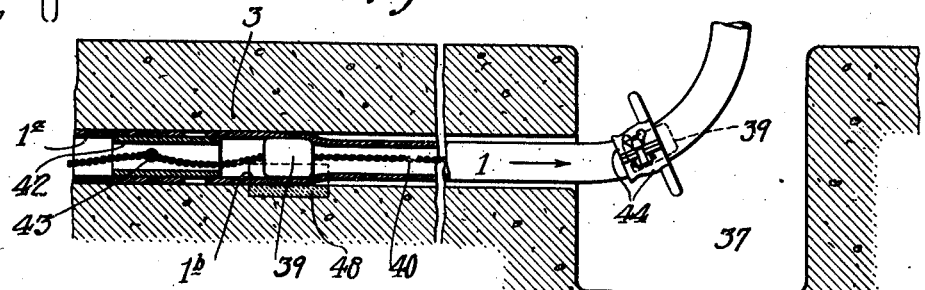
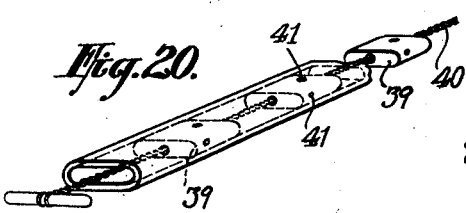

Patented Oct. 13, 1925.

1,556,869

UNITED STATES PATENT OFFICE.

THOMAS E. MURRAY, OF BROOKLYN, NEW YORK.

MOLDING CORE AND METHOD.

Application filed October 24, 1923. Serial No. 670,423.

*To all whom it may concern:*

Be it known that I, THOMAS E. MURRAY, a citizen of the United States, residing in the city of Brooklyn, county of Kings, and State of New York, have invented certain new and useful Improvements in Molding Cores and Methods, of which the following is a specification.

My invention aims to provide an improvement in cores and methods for forming openings in molded material, and particularly for molding conduits of various sorts, such for example as the conduits of concrete which are generally used to carry electric cables.

The accompanying drawings illustrate embodiments of my invention.

Fig. 1 is a longitudinal section through a part of a conduit with a core in place;

Fig. 2 is a similar section showing the core partly withdrawn;

Fig. 3 is a transverse section on the line 3—3 of Fig. 2;

Figs. 4 and 5 are respectively a longitudinal and a transverse section (on the line 5—5 of Fig. 4) and Fig. 6 is a perspective view, illustrating the application of a handle to the core for pulling it out;

Fig. 7 is a longitudinal section of a modified style of core;

Figs. 8 and 9 are longitudinal sections of a curved and a straight core respectively with a modified style of pulling device; and Fig. 10 is a transverse section on the line 10—10 of Fig. 9;

Fig. 11 is a longitudinal section showing a modified style of connection of the pulling device with the core, and illustrating the latter partly withdrawn;

Figs. 12 and 13 illustrate in longitudinal and transverse section respectively, modifications in the composition or construction of the core and in the pulling device;

Figs. 14 and 15 are longitudinal and transverse sections respectively illustrating another style of reinforcement and of the pulling device;

Fig. 16 is a longitudinal section illustrating still another style of reinforcement and of the pulling device;

Figs. 17 and 18 are longitudinal and cross-sections respectively illustrating a slightly modified style of pulling device;

Fig. 19 is a vertical section through a conduit and manhole illustrating another style of pulling device;

Figs. 20 and 21 are details of Fig. 19 in perspective;

Fig. 22 is an elevation of certain supporting blocks.

The core is made of sufficient strength to support the concrete or other material molded around it in plastic condition and of a material, in whole or in part, which is resilient or capable of being elongated and at the same time contracted in cross-section, such as rubber for example, and which will also return to substantially its original form when the elongating strain is released. Thus after the concrete has set and hardened, a pull on the core will contract it, however slightly, sufficiently to permit its withdrawal. The pressure set up by the casting of the plastic material around it will depend on the size of the opening required, the weight of the plastic material, and the height of the latter above the opening; and the material used must be of such strength and dimensions as to withstand this pressure.

For example, the core may be a solid length of rubber, in which term I include not only a material which is all rubber, but also rubber compositions of various sorts containing adulterants or reinforcing materials.

Or a tube of such rubber may be used with a sufficiently thick wall to support the pressure, or with supplementary supporting or reinforcing means. For example, the tube may be reinforced by an inner core, either solid or tubular of spongy rubber or other similar material of a lower grade and quality; or by some sort of a collapsible mandrel such as a wire spiral or other flexible device.

Various means may be provided, some of which are described hereinafter in detail, for withdrawing the core and the inner mandrel or reinforcement. For making long openings or conduits, the core is provided in sections connected end to end in such a way as to prevent the concrete from running down at the connections. And the joints may be such that the pull on one length of the core will be transmitted directly to the next length; or so that one length will be pulled clear and freed from the surrounding concrete before the pull is exerted on the next length.

Supporting and spacing means for the core are provided of such a character as not to indent the core substantially at the points of support. And where a number of openings are required, one above another, such supports will space the cores properly. These outside supports also permit the application of pressure from wedges or otherwise within the cores at the supported points without injury to the tubular core or to the surrounding concrete.

In the form shown in Figs. 1 to 6, the core is composed of an outer tube 1 of comparatively high elasticity, such as a good rubber composition, and an inner tube 2 of less elasticity such, for example, as a cheaper rubber composition. The outer tube fits on the inner one with just sufficient looseness to permit relative movement, but not enough to permit the collapsing of the core substantially under the weight of the concrete. The concrete 3 is poured around this core and allowed to set for the required time. The core is then removed by a direct longitudinal pull as indicated in Fig. 2. This pull causes a slight contraction of the outer tube and, if the pull be great enough, of the inner tube. At points remote from the application of the pull, the core will adhere to the concrete until the strain is sufficient to cause such a contraction of the core at the near points as will permit it to yield; and this yielding will be progressive along the length of the core so as to permit the gradual elongation and withdrawal of the latter. The elongation necessary to secure this result needs to be only a small fraction of the total length of the tube.

A great variety of devices may be applied for pulling the core out. In Figs. 4 and 5 for example, the outer tube 1 is formed with lugs 4 molded or vulcanized on its inner face, in which are embedded plates 5 extending beyond the end of the tube with openings through which a handle 6 may be passed.

In the modification shown in Fig. 7, the core is made of a solid tube 7 reinforced with spiral and longitudinal cord fibers 8 and 9 respectively. For example the rubber composition and the core reinforcement may be similar to those used in automobile tires.

Fig. 8 illustrates what is equally true of the other constructions, that the core is flexible so as to permit the curving of it longitudinally for the purpose of molding bends or other curved shapes to conduits.

This figure, and Figs. 9, 10 and 11, show the core made of a single tube without reinforcement, the composition and thickness of the walls being such as to provide sufficient strength for supporting the molded material and for maintaining their shape in cross-section on curves as in Fig. 8. The pulling device in Figs. 8, 9 and 10 comprises a pair of chains 11 extending out of the end of the core to a handle 12 and connected to eyes 13 fastened to the tube at intervals along its length. The chains are arranged with a certain slack between the successive points where they engage the eyes 13. When the handle is pulled the strain is applied to the nearest eyes and the section of the core from the first eyes to the second is elongated and contracted until all the slack is taken up between these two points of attachment of the chain. Thereafter the second section of the core, between the second and the third set of eyes is elongated and separated from the surrounding conduit; and so on to the end. Thus we avoid subjecting the core to extraordinary longitudinal strain in order to contract the remote portion thereof, and we permit the application of the method to cores of considerable length, independently of the strength of the material of which the core is made.

According to Fig. 11, a single chain 14 is used between each pair of fastening devices, the latter consisting of pins 15 with their ends held in lugs 16 on the forward ends of separate sections 17 of the tubing. The chains 14 are normally slack as illustrated. When the handle 18 is pulled the first section 17 of the core is withdrawn to an extent permitted by the slack in the first section of chain. By making the tube in separate sections 17, the sections do not have to be elongated to the full length of the chain, the first section parting from the second and going along with the handle to an extent permitted by the frictional engagement of its rear end with the surrounding concrete 3.

According to Figs. 12 and 13 the tube 19 of rubber composition is reinforced by an embedded spiral 20 of flat wire or the like. This wire is bent inward at suitable points to form loops 21 to which are fastened the branch cables 22 which lead to the main cable 23 by which the core is pulled out of the conduit.

In the scheme of Figs. 14 and 15, a tube 24 is used of elastic rubber composition and is reinforced by an inside support comprising a spiral wire 25, which in turn is held distended by means of a diaphragm or plate 26 extending across the diameter of the spiral. The rubber tube has a slight play on the wire spiral and the latter has a slight play on the plate 26 so as to permit the necessary contraction of the core when its end (or the end of any section thereof) is pulled. Preferably the spiral is fixed to the plate 26 at intervals in its length as by welds 27. To the tube 24 are fastened at intervals eyes 28 which are connected to chains 29. The eyes pass freely through the coils of the wire and pull the latter and the plate 26 along with the tube. This spiral wire support may be curved as in Fig. 8, or straight as desired.

According to Fig. 16, a handle 30 is mounted on a tubular shank 31 about which the end of the core is clamped. The core in this case is a tube 32 of rubber composition reinforced by an embedded spiral 33 of fine wire. From the handle, strong wires or cables 34 are connected to the tube at different points in its length. These wires may be always taut, or with practically no slack, so as to pull simultaneously on successive sections of the tubing; though generally I prefer the arrangement previously described where the pull is exerted on the tube sections one after the other.

In Figs. 17 and 18, the tube 32 and reinforcement of spiral wire 33 are the same as before. The pulling device comprises a pair of flexible wires or cables 35 which pass through eyes 36 fastened on the tube and which have a transverse bend at these points and a certain amount of slack between the points of attachment. With this arrangement the sections of the tube will be pulled one after the other to withdraw them. The slack in the wires 35 represents the desired limit of the stretch applied to the rubber tube. The reinforcing wire spiral may be either embedded in the rubber as shown or located within the tube in position to hold the latter out against the pressure of the concrete being molded.

Fig. 19 shows the conduit opening into a manhole 37. The flexibility of the core permits it to be withdrawn at the manhole and turned upward on to a take-up reel. The core in this case is formed of one or more sections of rubber tubing 1 similar to that shown in Fig. 1. It is reinforced, and the withdrawal of it from the conduit is facilitated, by means of blocks 39 spaced close enough to support the tubing against the pressure of the concrete, but sufficiently far apart to permit it to bend in order to form bends in the conduit and in order to permit withdrawal through a manhole as illustrated. The blocks 39 are spaced and connected together by means of a flexible medium such as the chain 40 which passes through them and to which they are attached by means of pins 41 (Fig. 20) passing through the blocks and through links of the chain. At the end of each section, as for example the section 1ª, at the left of Fig. 19, there is a sleeve 42 of thick, comparatively soft, pliable rubber or other suitable material vulcanized or cemented into the end of the section and projecting slightly beyond the end, the projecting portion being removably fitted into the adjacent section 1ᵇ of the tube. The sleeve 42 carries a transverse pin 43 to which the chain is attached. When the section 1ᵇ is pulled out it separates from the wall of the conduit progressively as described.

Fig. 19 shows the situation when it has been thus separated and pulled out except for its rear end which embraces the sleeve 42. The chain between the rearmost block 39 and the pin 43 is slack, but to the right of the block 39 it is taut. A slight further pull will remove the entire length of the tubular section 1ᵇ, and will tighten the intermediate length of chain so as to commence the corresponding pull through the pin 43 and sleeve 42 on the next section 1ª.

The blocks 39 are sufficient in size to hold the tubing distended in use. They make an easy fit in the tubing. When the tubing is pulled, therefore, there is contraction not only of the portion in advance of the block, but also a sufficient contraction of the portion surrounding the block, as indicated in Fig. 19, to free the tubing from the concrete and thus to permit a further movement of the tubing and of the block within it.

The blocks 39 have the additional function of shaping the cross-section of the tube, which they fit loosely, but with sufficient accuracy to hold the tubing distended to substantially the contour of the block. For example, Fig. 20 shows the blocks oblong in cross-section and the tube of the same shape so as to mold a conduit fitted to take several electric cables alongside of each other without any waste of space vertically. For a conduit of this shape it will be preferable to mold the tubing in the beginning to the desired cross-section, so that the function of the blocks will be not so much to shape the tubing, as to hold it in its original shape. The tubing in fact may be formed of various shapes in cross-section, according to the shape desired for the opening in the molded material. And the same is true for the several other styles of core referred to above.

A further and important function of the blocks 39 is to provide for conveniently gripping the tube, so as to pull it not only from its end but from intermediate points in its length. To this end the blocks 39 co-operate with a clamp (Fig. 21) composed of two members 44 with handles, the members being hinged together at one side and clamped with a swivel bolt 45 and thumb nut 46. The clamping members are applied, as at the right of Fig. 19, to the outside of the tube in line with one of the blocks. Preferably the members 44 have reduced rear ends 47 which contract the tube slightly at the rear of the block to get a more certain pulling hold. By this means, the core may be pulled out for a length corresponding to the distance between two blocks, or between several blocks, and the clamp then shifted to the first block outside of the end of the conduit and the operation repeated; the free end of the core being taken up on the reel. The connected blocks, therefore, serve to reinforce the outer tube against the pressure of the concrete, to shape the cross-section of the core and to permit the operator to take hold of the core at successive points in its length without unduly collapsing the tube. Various other means may be provided for serving the same function. For example, the inner tube 2 of Fig. 1 may be made of oblong or other desired shape in cross-section, and may be made in separate pieces with flexible connections between them like those between the blocks of Fig. 20, and may thus serve the same purposes as these blocks, constituting in effect hollow blocks.

In building a conduit, the concrete may first be placed and leveled to the height of the bottom of the opening, or may even be grooved along the line of the opening. The core will then be supported with proper alignment on the concrete and additional concrete poured around the sides and over the top of the mold. I prefer, however, to use supports for the core at intervals which will permit the plastic material to be cast under and around the mold at one operation. Suitable supports are illustrated in Fig. 22, consisting of blocks 48 formed in segments adapted when placed together to surround the core 1 and having extensions 49 and 50 at their sides and ends which serve to space them at proper intervals when a number of conduits are to be built through a single mass of concrete. For a single conduit, one of the segments 48 is placed in line below a part of the core carrying one of the inside blocks 39; other supporting blocks 48 being similarly placed at intervals along the length of the core. Such blocks support the core at sufficiently close intervals to hold it substantially straight; that is, to prevent sagging and, by reason of the embracing side portions of the supports, to prevent lateral deflection. The supporting blocks are left in as a permanent part of the finished structure. See Fig. 19.

Fig. 22 illustrates the use of these supports for conduits alongside of each other and one above another. A pair of segments embraces a lower conduit and the segments for the conduit above are supported directly on the first; their dimensions being such as to preserve the desired spacing. Similarly the segments at the sides are abutted directly against those first placed, being dimensioned to give the required lateral spacing. Instead of having the outer contour shown, these blocks may be made substantially rectangular, or of other desired shape.

In the present application I have claimed the invention broadly in so far as the tube is concerned, and also in connection with reinforcements or mandrels and with supporting and withdrawing devices. In another application, Serial No. 679,521, I have described and claimed specifically the use of the core of rubber and of such quality and dimensions that, without reinforcements or inner mandrel, it will support the weight of the plastic composition, and will at the same time be capable of easy withdrawal, and will have certain other advantages specified therein.

Though I have described with great particularity of detail certain embodiments of my invention, yet it is not to be understood therefrom that the invention is restricted to the particular embodiments disclosed. Various modifications may be made by those skilled in the art without departure from the invention as defined in the following claims.

What I claim is:—

1. The method of molding conduits which consists in setting in place an elastic tubular core of sufficient strength to support the external pressures of the molded material and of such a composition that when extended in one direction it will contract in a transverse direction and when released it will resume its original shape and holding said core in place by external means engaging the top of it, molding the material about said core while thus held in place and, when the molded material has sufficiently hardened, pulling the core longitudinally and thereby contracting it sufficiently to free it and to cause it to yield and to be withdrawn.

2. The method of molding conduits having a multiplicity of ducts at different elevations which consists in setting in place elastic tubular cores of sufficient strength to support the external pressures of the molded material and of such a composition that when extended in one direction they will contract in a transverse direction and when released they will resume their original shape and holding said cores in place in a proper relation to each other by external means engaging the tops thereof, molding the material about said cores while thus held in place and, when the molded material has sufficiently hardened, pulling the cores longitudinally and thereby contracting them sufficiently to free them and to cause them to yield and to be withdrawn.

3. The method of molding conduits having a multiplicity of ducts at different elevations which consists in setting in place elastic tubular cores of sufficient strength to support the external pressures of the molded material and of such a composition that when extended in one direction they will contract in a transverse direction and when released they will resume their original shape and holding said cores in place in a proper relation to each other by external means engaging said cores, molding the material about said cores while thus held in place and, when the molded material has sufficiently hardened, pulling the cores longitudinally and thereby contracting them sufficiently to free them and to cause them to yield and to be withdrawn.

4. The method of molding conduits which consists in setting in place an elastic tubular core of sufficient strength to support the external pressures of the molded material and of such a composition that when extended in one direction it will contract in a transverse direction and when released it will resume its original shape and holding said core in place by external means engaging the sides thereof to prevent lateral deflection, molding the material about said core while thus held in place and, when the molded material has sufficiently hardened, pulling the core longitudinally and thereby contracting it sufficiently to free it and to cause it to yield and to be withdrawn.

5. The method of molding conduits which consists in setting in place an elastic tubular core of sufficient strength to support the external pressures of the molded material and of such a composition that when extended in one direction it will contract in a transverse direction and when released it will resume its original shape and holding said core in place by external means, molding the material about said core while thus held in place and, when the molded material has sufficiently hardened, applying a longitudinal pull to the inside of the core progressively along its length and thereby contracting it sufficiently to cause it to yield.

6. The method of molding conduits which consists in molding a plastic material about an elastic core and applying a longitudinal pull to the inside of the core progressively along its length and thereby contracting it sufficiently to cause it to yield and to be withdrawn.

7. The method of molding conduits which consists in setting in place an elastic core, holding the same in place by external means, molding a plastic material about the core and applying a longitudinal pull to the inside of the core progressively along its length and thereby contracting it sufficiently to cause it to yield and to be withdrawn.

8. A core for forming openings in molded material, said core being flexible, being of sufficient strength to support the external pressures of the molded material and being of such a composition that when extended in one direction it will contract in a transverse direction and when released will resume its original shape in combination with positioning means for holding said core in place by external engagement therewith and means for pulling said core by internal engagement therewith to contract it transversely.

9. A core for forming openings in molded material, said core being flexible, being of sufficient strength to support the external pressures of the molded material and being of such a composition that when extended in one direction it will contract in a transverse direction and when released will resume its original shape in combination with positioning means for holding said core in place by external engagement therewith and means for applying a longitudinal pull to the inside of the core progressively along its length to contract it transversely.

10. An elastic core for molding conduits in combination with means for applying a longitudinal pull to the inside of the core progressively along its length to contract it transversely.

11. An elastic core for molding conduits in combination with external means for holding it in place and means for applying a longitudinal pull to the inside of the core progressively along its length to contract it transversely.

12. A core for molding conduits comprising in combination an outer tube and an inner tube reinforcing the outer one, said core adapted when pulled longitudinally to contract and permit withdrawal.

13. A core for molding conduits comprising in combination an outer tube of elastic composition and an inner tube of less elastic composition reinforcing the outer one, said core adapted when pulled longitudinally to contract and permit withdrawal.

14. A core for molding conduits comprising a tube of such a composition that when pulled longitudinally it will contract enough to yield and permit withdrawal in combination with means engaging the core at intervals in its length for pulling the same.

15. A core for molding conduits comprising a tube formed of separable sections and of such a composition that when pulled longitudinally it will contract enough to yield and permit withdrawal in combination with means engaging the core for pulling the same, said pulling means adapted to exert a pull on the sections in successive order.

16. A core for molding conduits comprising a tube of such a composition that when pulled longitudinally it will contract enough to yield and permit withdrawal in combination with means engaging the core at intervals in its length for pulling the same, said pulling means extending continuously along the inside of the core and engaged with the latter at intervals, with a certain slack between points of engagement so as to exert a pull at different points in succession.

17. A core for molding conduits comprising a tube of such a composition that when pulled longitudinally it will contract enough to yield and permit withdrawal in combination with reinforcing members within the tube with flexible connections between them, said reinforcing members serving to assist the tube in supporting the molded material, to shape the cross-section of the tube, and to provide supports at intervals for a pulling member applied to the outside of the tube.

In witness whereof, I have hereunto signed my name.

THOMAS E. MURRAY.